US005157271A

United States Patent [19]

Fujiwara

[11] Patent Number: 5,157,271

[45] Date of Patent: Oct. 20, 1992

[54] APPARATUS FOR CONTROLLING A POWER SUPPLY OF AN ELECTRIC MACHINE IN A VEHICLE

[75] Inventor: Ryuhei Fujiwara, Tokyo, Japan

[73] Assignee: NEC Corporation, Tokyo, Japan

[21] Appl. No.: 550,850

[22] Filed: Jul. 10, 1990

[30] Foreign Application Priority Data

Jul. 13, 1989 [JP] Japan .................................. 1-181509

[51] Int. Cl.$^5$ .......................... H02H 7/18; H02J 7/35; H02J 9/06

[52] U.S. Cl. ...................................... 307/66; 307/10.7

[58] Field of Search ....................... 307/10.7, 10.1, 9.1, 307/64-66, 85, 86, 149, 150

[56] References Cited

U.S. PATENT DOCUMENTS 3,340,402 9/1967 Curtis ................................... 307/48
4,127,782 11/1978 Omura et al. ...................... 307/10.7
4,224,562 9/1980 Scheidler .............................. 322/26
4,497,240 2/1985 Nagat0mo et al. ............... 62/235.1
4,912,338 3/1990 Bingham .............................. 307/9.1
4,939,911 7/1990 Mandell .............................. 62/239
4,945,256 7/1990 Tada et al. ......................... 307/117
5,027,224 6/1991 Yamada .............................. 358/434

*Primary Examiner*—A. D. Pellinen
*Assistant Examiner*—Richard T. Elms
*Attorney, Agent, or Firm*—Sughrue, Mion, Zinn, Macpeak & Seas

[57] ABSTRACT

An electric machine such as a telephone set, a facsimile machine, etc. installed in a vehicle is supplied with an electric power from a power supply. The power supply is a battery which is charged from a generator driven by an engine of the vehicle, when the engine is rotated. On the other hand, the power supply is a secondary battery which is charged from the battery, when the engine is not rotated.

11 Claims, 4 Drawing Sheets

APPARATUS FOR CONTROLLING A POWER SUPPLY OF AN ELECTRIC MACHINE IN A VEHICLE

FIELD OF THE INVENTION

This invention relates to an apparatus for controlling a power supply of an electric machine in a vehicle, and more particularly to, an apparatus for controlling the change-over between a primary power supply and a secondary power supply for an electric machine such as a telephone set, a facsimile machine, etc. in a car.

BACKGROUND OF THE INVENTION

A conventional power supply for a mobile (portable) telephone set in a car is connected through an ignition (key) switch to a battery, so that an electric power is supplied to the telephone set, when the ignition switch is turned on. Therefore, when the ignition switch is turned off, the supply of an electric power is shut off to avoid unintentional consumption thereof. This structure is adopted, for the reason that electric power is consumed in the telephone set during not only an occupied state for communication, but also a waiting state for receiving a call. Consequently, the exhaustiveness of the battery is avoided by turning the ignition switch off.

However, the conventional power supply of a mobile telephone set in a car has a disadvantage in that an absentee receiving of facsimile information, an absentee (caretaking) recording of telephone message, etc. are not carried out, when an ignition key is pulled out and a driver leaves the car, so that the ignition switch is turned off to shut off the supply of an electric power to the telephone set.

SUMMARY OF THE INVENTION

Accordingly, it is an object of the invention to provide an apparatus for controlling a power supply of an electronics machine in a vehicle, by which the absentee receiving of facsimile information, the absentee recording of telephone message, etc. are carried out, even in a state of the turning-off of an ignition switch.

According to this invention, an apparatus for controlling a power supply of an electric machine in a vehicle, comprises:

a primary power supply for supplying an electric power to the electric machine, the primary power supply being a battery which is charged from a generator driven by an engine of the vehicle;

a secondary power supply for supplying an electric power to the electric machine, the secondary power supply being an additional battery which is charged from the battery;

means for selecting one power supply from the primary power supply and the secondary power supply; and means for controlling the selecting means to select the primary power supply, when the engine is driven, and to select the secondary power supply, when the engine is not driven.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
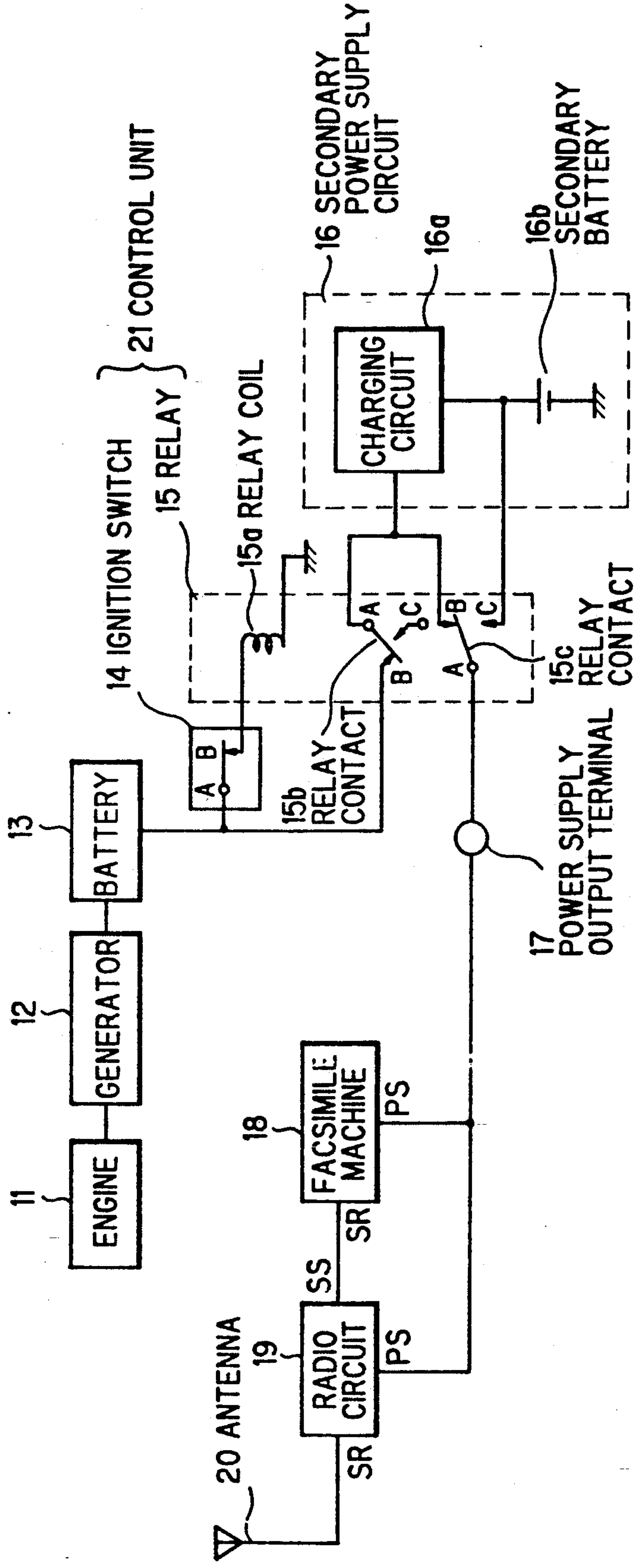
FIGS. 1 to 4 are block diagrams showing apparatus for controlling a power supply of an electronics machine in a vehicle in first to fourth preferred embodiments according to the invention.

FIG. 1 shows an apparatus for controlling a power supply of an electronics machine in a vehicle in the first preferred embodiment. The apparatus comprises a relay 15 including a relay coil 15*a* connected at one terminal to a terminal B of an ignition switch 14 and at the other terminal to the ground, a first relay contact 15*b* connected at a first fixed contact point B to a car battery 13 which is a primary power supply, at a movable contact point A to a secondary power supply circuit 16 and at a second fixed contact point C to an idle terminal, and a second relay contact 15*c* connected at a movable contact point A to a power supply output terminal 17, at first and second fixed contact points B and C to the secondary power supply circuit 16. The secondary power supply circuit 16 comprises a charging circuit 16*a* connected to the movable contact point A of the first relay contact 15*b* and the first fixed contact point B of the second relay contact 15*c*, and a secondary battery 16*b* connected at one terminal to the second fixed contact point C of the second relay contact 15*c* and at the other terminal to the ground. The ignition switch 14 is connected at the other terminal A to the car battery 13 to be charged from a generator 12 which is driven by an engine 11 of a car. A facsimile machine 18 connected to a telephone set (not shown) is connected at a power supply terminal PS to the power supply output terminal 17 and at a signal receiving terminal SR to a signal supplying terminal SS of a radio circuit 19 which is also connected at a power supply terminal PS to the power supply output terminal 17, and is connected at a signal receiving terminal SR to an antenna 20. In this circuitry arrangement, the ignition switch 14 and the relay 15 function as a control unit 21.

In operation, when the engine 11 is rotated, the generator 12 is driven to provide an electric power to the car battery 13 which is thereby charged. As a matter of course, the ignition switch 14 has been turned on in this state, so that the relay coil 15*a* of the relay 15 has been energized to turn the movable contact points A and A of the relay contacts 15*b* and 15*c* on the fixed contact points B and B thereof. As a result, a current flows from the car battery 13 through the relay contact 15*b* to the charging circuit 16*a* of the secondary power supply circuit 16, so that the secondary battery 16*b* is charged to have a predetermined voltage. At this stage, the power supply terminals PS and PS of the facsimile machine 18 and the radio circuit 18 are connected through the power supply output terminal 17, and the relay contacts 15*b* and 15*c* to the car battery 13, and are disconnected to the secondary battery 16*b* by the second relay contact 15*c*.

On the other hand, when the ignition switch 14 is turned off, the relay coil 15*a* is not energized to turn the first and second relay contacts 15*b* and 15*c* on the second fixed contact points C and C thereof, so that no current flows from the car battery 13 through the first and second relay contacts 15*b* and 15*c* to the power supply terminals PS and PS of the facsimile machine 18 and the radio circuit 19, but a current flows from the secondary battery 16*b* through the second relay contact 15*c* thereto. Therefore, the facsimile machine 18 can operate in an absentee receiving mode, until a voltage of the secondary battery 16*b* drops to be lower than a predetermined voltage due to the discharge of the secondary battery 16*b*. In operation of the facsimile machine 18, a call signal transmitted from a base station (not shown) is received in the radio circuit 19 by the antenna 20, so that the radio circuit 19 responds to the base station by transmitting a response signal through the antenna 20 to the base station in accordance with an appropriate supply of an electric power to the radio circuit 19 from the car battery 13 or the secondary battery 16*b* selected dependent on the turning on or off state of the ignition switch 14. Then, a communication channel is set to provide a transmitting and receiving mode in a telephone network. Once the communication channel is set in the telephone network, serial data indicating that a communication has started are supplied from the radio circuit 19 to the facsimile machine 18. Then, a starting code of a subcarrier Frequency Shift Keying (FSK) is transmitted at an audible band from the facsimile machine 18 through the radio circuit 19 to a facsimile machine of a caller by using an up-line of the communication channel, and a response signal is transmitted at the audible band from the facsimile machine of the caller through the radio circuit 19 to the facsimile machine 18, so that a facsimile transmission starts between the facsimile machine of the caller and the facsimile machine 18. During the facsimile transmission, it is required that an electric power is supplied to the radio circuit 19 and the facsimile machine 18 from the car battery 13 or the secondary battery 16*b*. As explained before, when the ignition switch 14 is turned off, an electric power is supplied from the secondary battery 16*b* to the facsimile machine 18 and the radio circuit 19. Consequently, the exhaustiveness of the car battery 13 is definitely avoided, while providing an absentee receiving service of a facsimile machine, an absentee (caretaking) recording service of a telephone message, etc. to users by use of the secondary battery 16.

Figure 2:
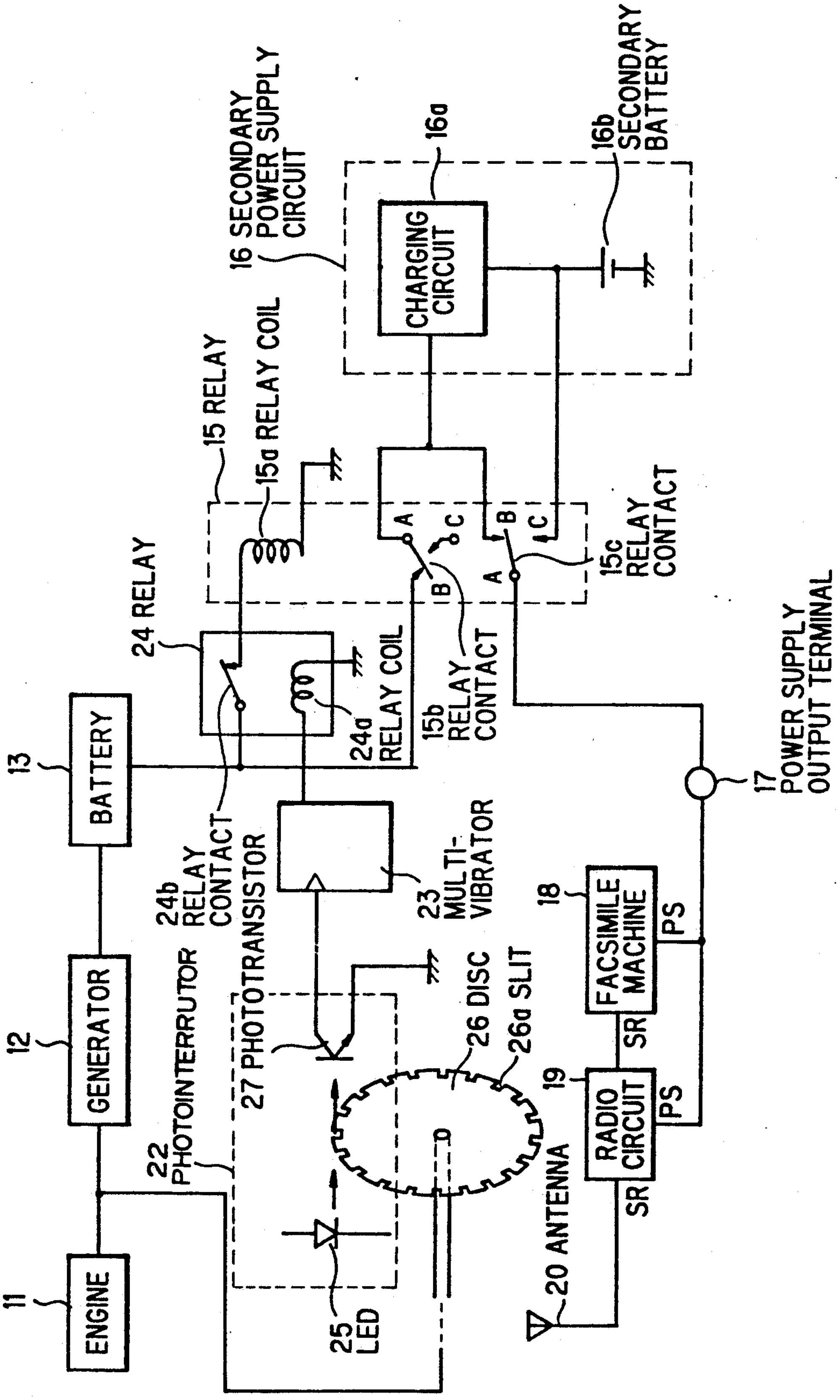

FIG. 2 shows an apparatus for controlling a power supply of an electronics machine in a vehicle in the second preferred embodiment, wherein like parts are indicated by like reference numerals as used in FIG. 1. In the second preferred embodiment, a control unit comprises a relay 15 which is the same as in the first preferred embodiment, a photointerruptor 22, a monostable multivibrator 23, and a relay 24 having a relay coil 24*a* and a relay contact 24*b*. The photointerruptor 22 comprises an LED 25, a disc 26 having slits 26*a*, and a phototransistor 27.

In operation, when an engine is driven, the disc 26 is rotated, so that a light radiated from the LED 25 is transmitted through slits 26*a* of the disc 26 to be detected periodically by the phototransistor 27. Then, an electric pulse train is supplied from the phototransistor 27 to the monostable multivibrator 23, so that a "high" output signal is supplied from the monostable multivibrator 23 to the relay coil 24*a* of the relay 24. As a result, the relay coil 24*a* is energized to turn the relay contact 24*b* on, so that a relay coil 15*a* of the relay 15 is energized to turn a movable contact points A and A of first and second relay contacts 15*b* and 15*c* on first fixed contact points B and B thereof. Consequently, a secondary battery 16*b* of a secondary power supply circuit 16 is charged to have a predetermined voltage from a car battery 13, because the engine 11 runs to rotate. When the engine 11 does not run, the same operation as in the first preferred embodiment is carried out.

Figure 3:
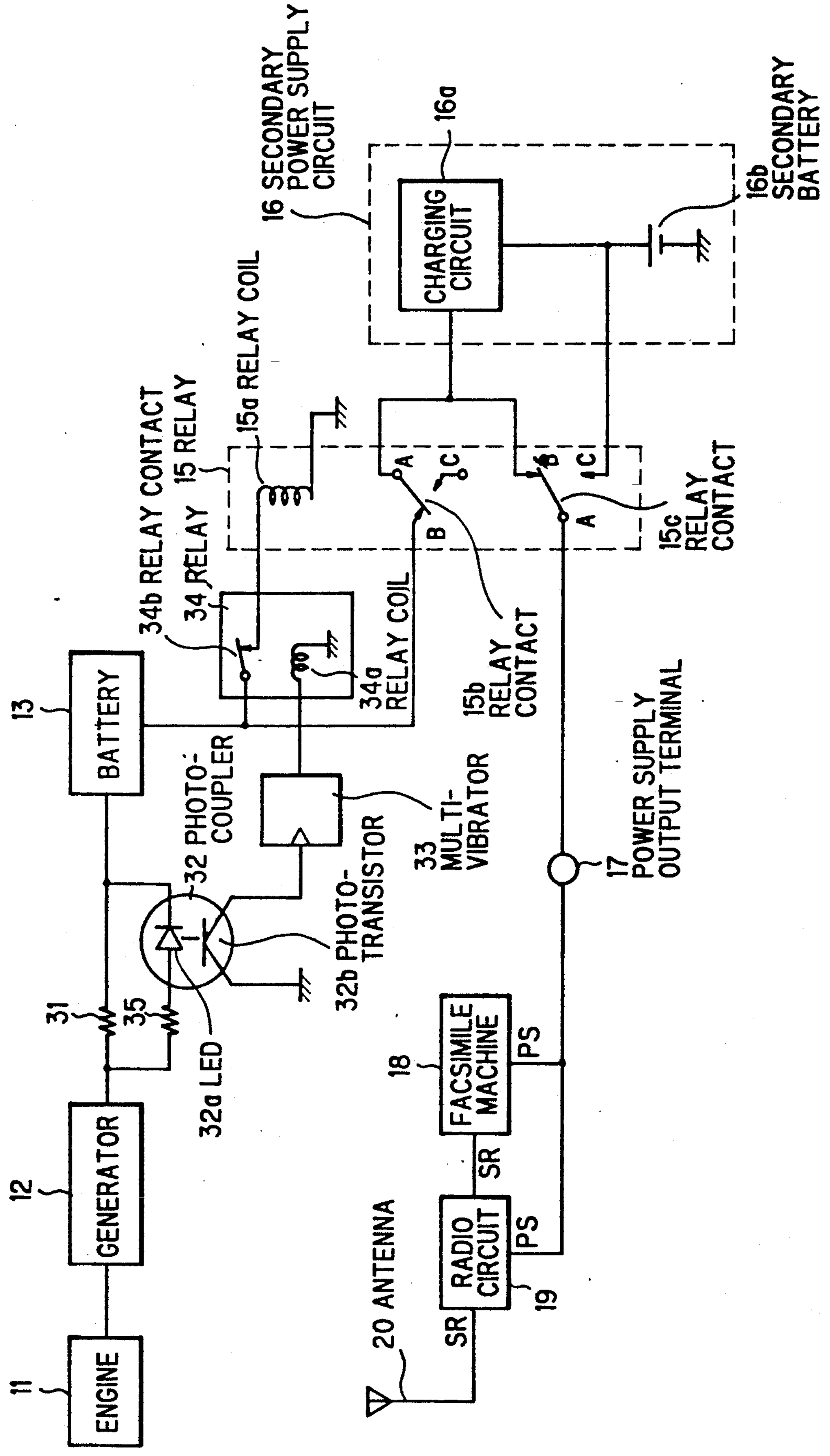

FIG. 3 shows an apparatus for controlling a power supply of an electronics machine in a vehicle in the third preferred embodiment, wherein like parts are indicated by like reference numerals as used in FIG. 1. In the third preferred embodiment, a control unit comprises a photocoupler 32 having an LED 32*a* and a phototransistor 32*b* connected to a resistance 35 in series and in parallel with a resistance 31 between a generator 12 and a car battery 13, a monostable multivibrator 33 receiving an input signal from the photocoupler 32, a relay 34 having a relay coil 34*a* and a relay contact 34*b* actuated by an output signal of the monostable multivibrator 33, and a relay 15 having the same structure as in FIG. 1. In this control unit, when an engine 11 runs, the generator 12 is driven to generate an electric power, so that a current which is controlled in value by values of the resistances 31 and 35 flows through the LED 32*a* of the photocoupler 32. Then, a light is emitted from the LED 32*a* to be received by the phototransistor 32*b*. In other words, a pulsation current supplied from the generator 12 is converted to an electric pulse train by the photocoupler 32. The electric pulse train is supplied to the monostable multivibrator 33, so that the relay coil 34*a* is energized to turn the relay contact 34*b* on by the output signal of the monostable multivibrator 33. Then, the relay coil 15*a* of the relay 15 is energized to turn movable contact points A and A of first and second relay contacts 15*b* and 15*c* of the relay 15 on relay contact points B and B thereof by the car battery 13, so that a secondary battery 16*b* of a secondary power supply circuit 16 is charged by the car battery 13. On the other hand, when the engine 11 does not run, the same operation as in the first preferred embodiment is carried out.

Figure 4:
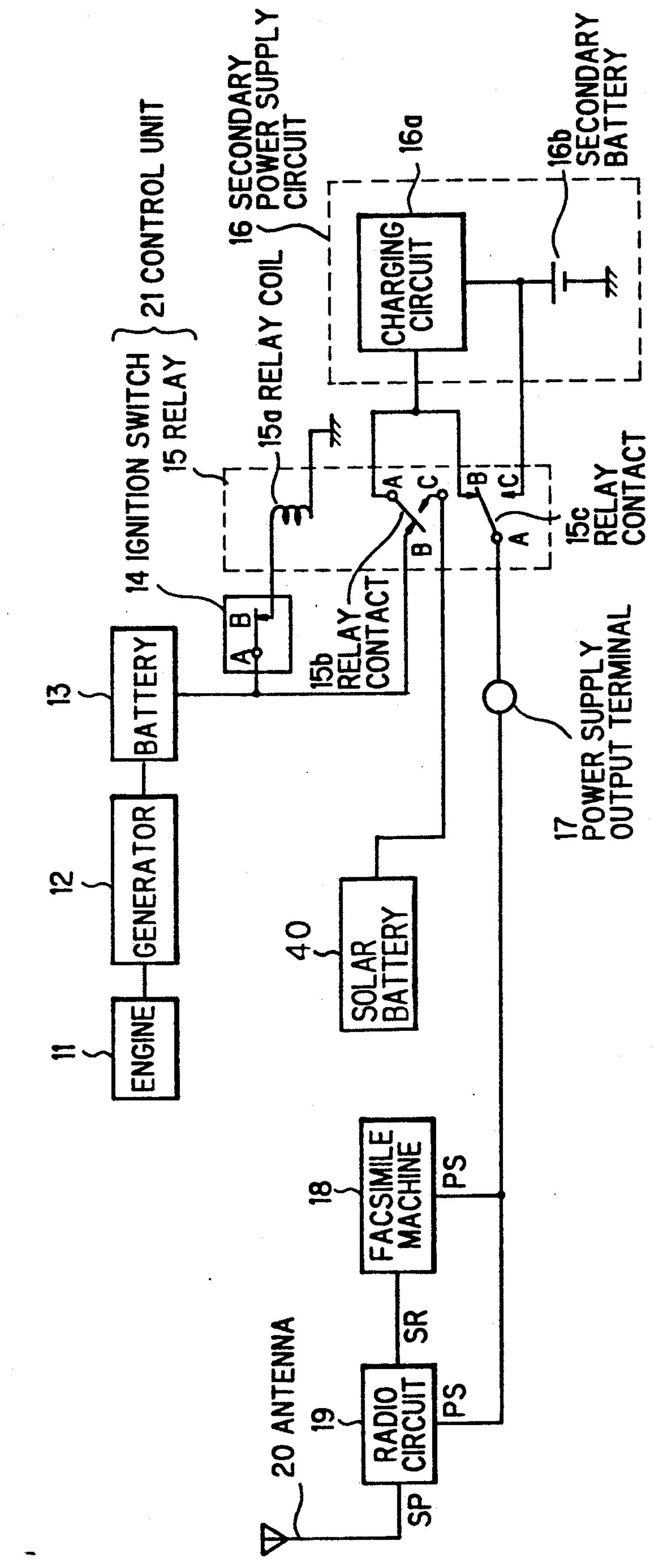

FIG. 4 show an apparatus for controlling a power supply of an electric machine in a vehicle in the fourth preferred embodiment, wherein like parts are indicated by like reference numerals as used in FIG. 1. In this apparatus, a second fixed contact point C of a first relay contact 15*b* of a relay 15 is connected to a solar battery 40. As understood from a circuitry structure, a secondary battery 16*b* of a secondary power supply circuit 16 is charged to have a predetermined voltage by the solar battery 40, when an ignition switch 14 is turned off. A charging circuit 16*a* of the secondary power supply circuit 16 avoids a reverse current flowing from the secondary battery 16*b* to the solar battery 40, when a voltage of the solar battery 18 is lower than that of the secondary battery 16*b*, for instance, at night. In the fourth preferred embodiment, the exhaustiveness of the secondary battery 16*b* is recovered to some extent by the solar battery 40, and an operation time can be longer for a telephone set and/or facsimile machine in a car due to the presence of the solar battery 40, when the ignition switch 14 is turned off.

Although the invention has been described with respect to specific embodiments for complete and clear disclosure, the appended claims are not to be thus limited but are to be construed as embodying all modifications and alternative construction that may occur to one skilled in the art which fairly fall within the basic teaching herein set forth.

What is claimed is:

1. An apparatus for controlling a power supply of an electric machine in a vehicle, comprising:

a primary power supply for supplying an electric power to said electric machine, said primary power supply being a battery which is charged from a generator driven by an engine of said vehicle;

a secondary power supply for supplying an electric power to said electric machine, said secondary power supply being an additional battery which is charged from said battery;

selecting means for, when the engine is driven, connecting said primary power supply both to said secondary power supply and said electric machine, while disconnecting said secondary power supply from said electric machine, and for, when the engine is not driven, disconnecting said primary power supply both from said secondary power supply and said electric machine, while connecting said secondary power supply to said electric machine; and means for controlling said selecting means to select said primary power supply, when said engine is driven, and to select said secondary power supply, when said engine is not driven.

2. An apparatus for controlling a power supply of an electric machine in a vehicle, according to claim 1, wherein:

said controlling means controls said selecting means to select said one power supply in accordance with a signal selected from either an ignition switch signal, an engine rotating signal, or a generator driven signal.

3. An apparatus for controlling a power supply of an electric machine in a vehicle, according to claim 1, further comprising:

a solar battery charging said additional battery, when said engine is not rotated.

4. An apparatus for controlling a power supply of an electric machine in a vehicle, comprising:

a secondary battery adapted to be charged by a vehicle battery which is charged in response to the running of a vehicle engine;

means for detecting the situation of the vehicle engine to produce a first detect signal when the vehicle engine is running or in an on-state and a second detect signal when the vehicle engine is not running or in an off-state; and switch means for coupling said vehicle battery both to said secondary battery and said electric machine, while decoupling said secondary battery from said electric machine, in response to said first detect signal, and for decoupling said vehicle battery both from said secondary battery and said electric machine, while coupling said secondary battery to said electric machine, in response to said second detect signal.

5. An apparatus as claimed in claim 4, wherein said detecting means comprises means for detecting the position of an ignition switch to produce said first and second detect signals when said ignition switch is in on-and off-positions, respectively.

6. An apparatus as claimed in claim 4, wherein said detecting means comprises:

a light emitting diode (LED);

a disc rotating along with the running of the vehicle engine and having a plurality of slots on the edge thereof, a light from said LED passing through at least one of said slots;

phototransistor means for detecting passed through at least one of said slots to produce a light detect signal; and means for producing said first detect signal in the presence of said light detect signal and said second detect signal in the absence of said light detect signal.

7. An apparatus as claimed in claim 4, wherein said detecting means comprises:

an LED connected between said vehicle engine and said vehicle battery to emit a light in response to the running of the vehicle engine;

phototransistor means for detecting said light to produce a light detect signal; and means for producing said first detect signal in the presence of said light detect signal and said second detect signal in the absence of said light detect signal.

8. An apparatus as claimed in claim 4, further comprising a solar battery, wherein said switch means comprises:

means for coupling said secondary battery and said vehicle battery in response to said first detect signal; and means for switching the coupling of said secondary battery from said vehicle battery to said solar battery in response to said second detect signal.

9. An apparatus as claimed in claim 4, wherein said electric machine comprises a facsimile machine.

10. A method of controlling a power supply to an electric device, comprising the following steps of:

detecting the situation of a vehicle engine to produce a first detect signal when the vehicle engine is running or in an on-state and a second detect signal when the vehicle engine is not running or in an off-state;

responsive to said first detect signal, charging a secondary battery from a vehicle battery which is charged in response to the running of the vehicle engine;

responsive to said first detect signal, supplying power from said vehicle battery to said electric device, while decoupling said secondary battery from said electric machine;

responsive to said second detect signal, decoupling said secondary battery and said electric machine from said vehicle battery; and responsive to said second detect signal, supplying power from said secondary battery to said electric device.

11. A method as claimed in claim 10, further comprising the step of, responsive to said second detect signal, coupling said secondary battery to a solar battery.

* * * * *

UNITED STATES PATENT AND TRADEMARK OFFICE

CERTIFICATE OF CORRECTION

PATENT NO. : 5,157,271

DATED : October 20, 1992

INVENTOR(S) : Ryuhei FUJIWARA

It is certified that error appears in the above-identified patent and that said Letters Patent is hereby corrected as shown below:

Col. 6, line 5, after "detecting", insert --a light--.

Signed and Sealed this

First Day of February, 1994

Attest:

BRUCE LEHMAN

Attesting Officer

Commissioner of Patents and Trademarks